United States Patent
Yoshimoto et al.

[11] Patent Number: 5,160,586
[45] Date of Patent: * Nov. 3, 1992

[54] OZONE DECOMPOSING REACTOR

[75] Inventors: Masafumi Yoshimoto; Tadao Nakatsuji; Kazuhiko Nagano; Tetsuo Tatsu, all of Osaka, Japan

[73] Assignee: Sakai Chemical Industry Co., Ltd., Osaka, Japan

[*] Notice: The portion of the term of this patent subsequent to Oct. 27, 2009 has been disclaimed.

[21] Appl. No.: 525,597

[22] Filed: May 21, 1990

[30] Foreign Application Priority Data

May 19, 1989 [JP] Japan ................... 1-127528
Jun. 6, 1989 [JP] Japan ................... 1-143380
Dec. 12, 1989 [JP] Japan ................... 1-322374

[51] Int. Cl.$^5$ .................. C25B 1/00; C25B 9/00; C25F 5/00
[52] U.S. Cl. .................. 204/59 R; 204/130; 204/252; 204/242; 204/282; 204/295; 502/20; 429/30; 429/32
[58] Field of Search .................. 204/59 R, 129, 130, 204/140, 141.5, 242, 252, 282, 295; 502/20; 429/30, 32

[56] References Cited

U.S. PATENT DOCUMENTS

| | | | |
|---|---|---|---|
| 3,400,054 | 9/1968 | Ruka et al. | 204/427 |
| 4,101,296 | 7/1978 | Lowther | 423/219 |
| 4,670,360 | 6/1987 | Habermann et al. | 204/294 |

FOREIGN PATENT DOCUMENTS 0675253 7/1952 United Kingdom ............... 204/130

Primary Examiner—John Niebling
Assistant Examiner—Kathryn Gorgos
Attorney, Agent, or Firm—Wenderoth, Lind & Ponack

[57] ABSTRACT

There is disclosed an ozone decomposing reactor which comprises:
a catalyst structure composed of a carrier having at least one passage extending therethrough for allowing an ozone containing fluid to pass through the catalyst structure and a catalyst and an electroconductive material carried in or on the carrier; and
electrodes attached to the catalyst structure to electrify the structure, whereby to decompose ozone at elevated temperatures.

The carrier is either a ceramic honeycomb mold or a fiber board.

14 Claims, 3 Drawing Sheets

OZONE DECOMPOSING REACTOR

BACKGROUND OF THE INVENTION

This invention relates to a reactor for decomposing ozone contained in a fluid such as a waste water or a waste gas. The invention further relates to a method of the regeneration of such a reactor.

There has been proposed various methods of decomposing noxious ozone contained in the air, for example, an adsorption method wherein porous material is used such as activated carbon or zeolite, or an oxidative decomposition method wherein a catalyst is used such as $MnO_2$.

However, the above known methods of decomposing ozone are not satisfactory ones. The adsorption method has a disadvantage in that an adsorbent must be regenerated frequently since it is limited in adsorption ability. Therefore, such method is laborious and costs a great deal. The oxidative decomposition method has no such disadvantages as above described, but the known catalysts have no sufficient decomposition activity of ozone, but also deteriorate in activity very soon when they are used under severe conditions, for example, when a gas which contains a high concentration of ozone is treated or a gas is treated with a high space velocity.

The invention has been accomplished to solve the problem involved in the prior art of ozone decomposition, and it is an object of the invention to provide a reactor which oxidatively decomposes ozone at a high rate even under severe conditions.

It is a further object of the invention to provide a method of decomposing ozone using such a reactor.

It is still a further object of the invention to provide a method of regenerating such a reactor.

BRIEF DESCRIPTION OF THE DRAWINGS

Other features and advantages of the invention will be apparent from the following description taken in connection with the accompanying drawings, wherein.

Figure 1:
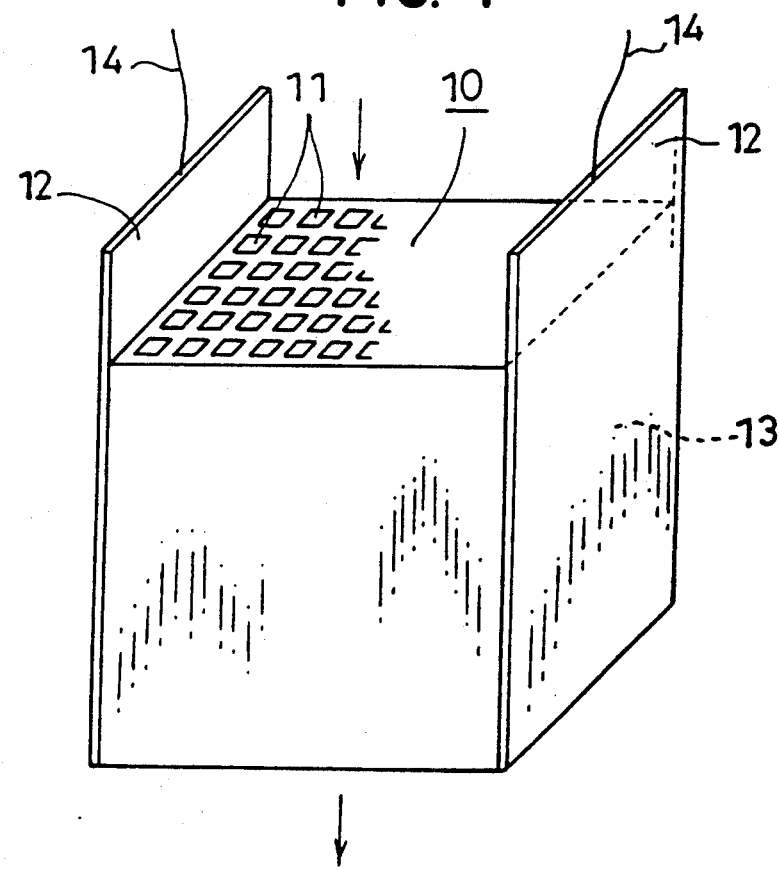
FIG. 1 is a perspective illustration of an ozone decomposing reactor of the invention.

Herein the specification, the term, catalyst, means active components which have ozone decomposition activity. The catalyst is usually supported on a carrier to form a catalyst structure, or is molded into a mold structure together with other molding components, for practical use. These structures will be referred to as catalyst structures.

SUMMARY OF THE INVENTION

In accordance with the invention, there is provided an ozone decomposing reactor which comprises:

a catalyst structure composed of a carrier having at least one passage extending therethrough for allowing an ozone containing fluid to pass through the catalyst structure and a catalyst and an electroconductive material carried in or on the carrier; and electrodes attached to the catalyst structure to electrify the structure, whereby to decompose ozone at elevated temperatures.

DESCRIPTION OF THE PREFERRED EMBODIMENT

Any known catalyst may be supported on a carrier, and the catalyst may include, for example, $MnO_2$, $MoO_3$, $CuO$, $Fe_2O_3$, $Ag_2O$, $NiO$, $Co_3O_4$, $WO_3$, $V_2O_5$, $SnO_2$, Pt and Pd. These catalysts may be used singly or as a mixture of two or more. Further, there may be used as a catalyst, for example, a binary catalyst such as $MnO_2/TiO_2$, $MnO_2$/alkali metal oxide or $MnO_2$/alkaline earth metal oxide, or a zeolite catalyst composed of a zeolite having a metal of an oxide of which oxide formation enthalpy $-\Delta H°f$ is of not more than 100 Kcal/g-atom of oxygen.

The electroconductive material used in the invention may be any material of electrical resistance which generates heat when being electrified. Thus, there may be used as such an electroconductive material, for example, graphite, carbon fibers, silicon carbide, silver, nickel-chromium alloy, chromium-aluminum alloy or stainles steel. These electroconductive materials may be in the form powder, whisker or fiber.

The catalyst is usually supported on an inactive carrier material, such as a ceramic carrier material, together with an electroconductive material to form a catalyst structure suitable for practical use. By way of example, a catalyst powder and an electroconductive material are formed into an aqueous plastic or moldable mixture, if necessary, together with a ceramic powder such as of alumina, silica, alumina-silica, titanium dioxide, zirconium dioxide or clay, and an organic binder such as methyl cellulose, polyvinyl alcohol, polyvinyl chloride or polyethylene oxide. Then, the mixture is extrusion-molded into a honeycomb structure, dried, and if desired, sintered, to provide a catalyst structure having a plurality of passages extending therethrough for allowing an ozone containing fluid to pass through the structure.

The catalyst structure contains the catalyst in an amount preferably of 30–70% by weight. The incorporation of the catalyst into the catalyst structure in an amount of more than 70% by weight finds no special advantage, but is rather undesirable from the economical standpoint. However, when the amount of the catalyst supported on the catalyst structure is less than 30% by weight, the acitivity of ozone decomposition attained is low.

The catalyst structure contains the electroconductive material also in an amount preferably of 30–70% by weight. When the amount of the electroconductive material in the catalyst structure is more than 70% by weight, contact of the catalyst with ozone is hindered to decrease the decomposition activity of the catalyst structure. Meanwhile, it is difficult to produce such a catalyst structure of a high content of electroconductive material since the mixture is very poor in moldability. However, when the amount of the electroconductive material in the catalyst structure is less than 30% by weight, the catalyst structure remains substantially electrically insulative so that it is not heated to an elevated temperature desired to effectively decompose ozone.

FIG. 1 illustrates an embodiment of a honeycomb catalyst structure 10 which has a number of passages 11 square in section extending through the structure. The ozone decomposing reactor of the invention has a pair of electrodes 12 each in contact with the side wall 13 and electrocoductive lead wires 14 each connected to the electrode, so that the honeycomb structure is electrified. The electrode may be of a copper or stainless steel plate of a thickness of about 0.1–0.2 mm. However, the electrode may be in the form of disk, tube or wire of other materials including aluminum or carbonaceous material, if desired.

Figure 2:
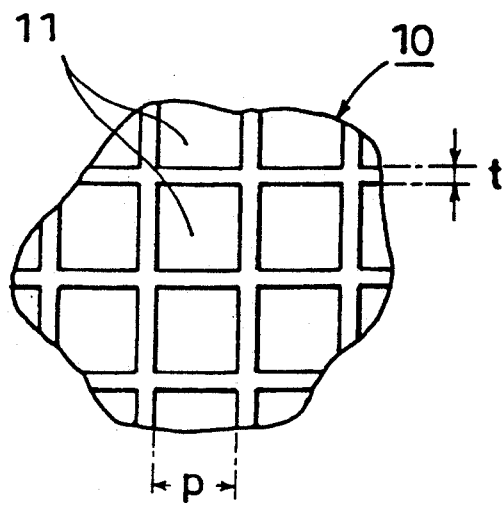
FIG. 2 is a partly enlarged plan view of a catalyst structure used in the reactor of the invention.

FIG. 2 shows an enlarged plan view of the passages 11 of the catalyst structure 10 in part. It is preferred that the honeycomb structure has walls of a thickness t of about 0.1–1.0 mm and a pitch p of about 1.0–7.0 mm. However, the passages are not specifically limited in section, and it may be not only square as illustrated, but also circular, triangle or hexagonal.

Figure 3:
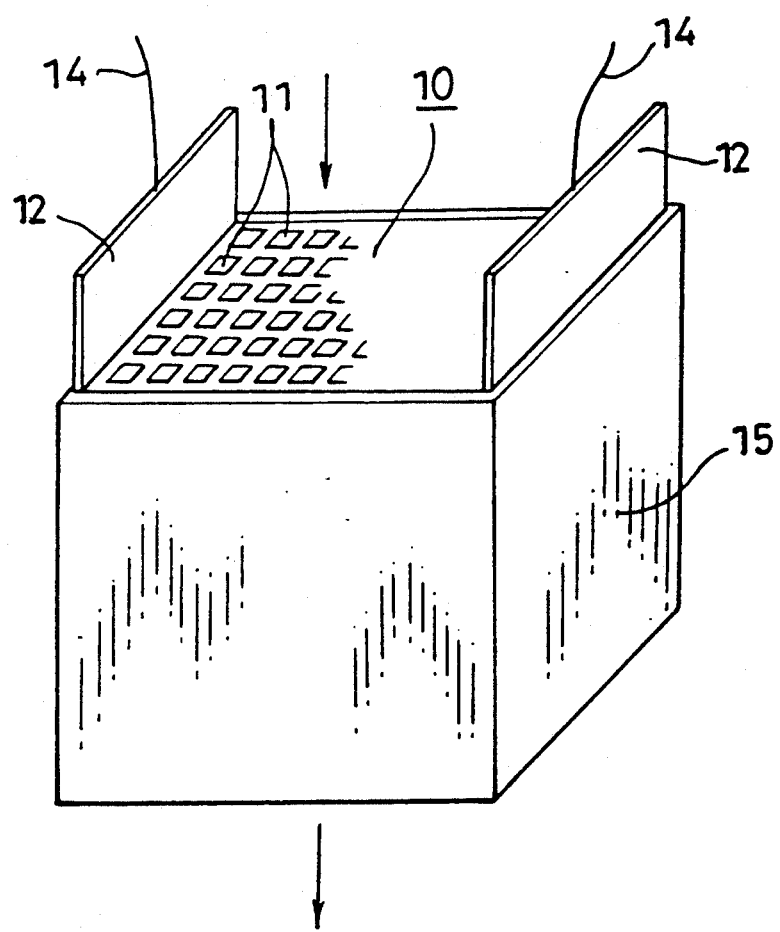
FIG. 3 is a perspective illustration of an ozone decomposing reactor in a casing of the invention.

In actual use, the catalyst structure 10 is fitted in an insulating casing 15, as illustrated in FIG. 3, and an ozone containing fluid is passed through the passages 11, as indicated by arrows.

As a second method, an electroconductive honeycomb carrier mold of ceramic material such as of titanium dioxide which contains an electroconductive material may be first produced, and then the catalyst may be supported on the honeycomb carrier, as described hereinafter. As a third method, a ceramic carrier mold is first prepared, and then an electroconductive material and a catalyst may be supported thereon.

Figure 4:
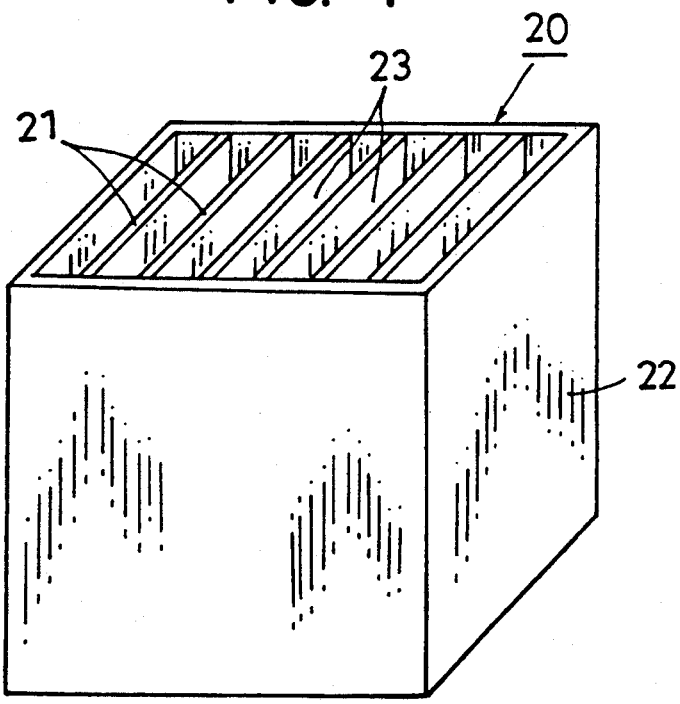
FIGS. 4 and 5 are perspective illustrations of catalyst structures used in the reactor of the invention.
Figure 5:
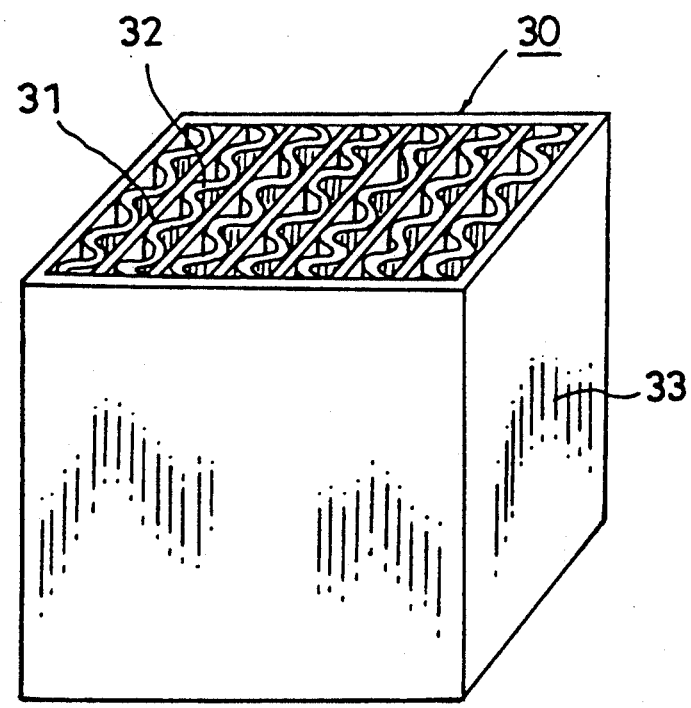

The honeycomb structure in a wide sense may be of a plurality of fiber board arranged so that passages are formed therebetween. FIG. 4 illustrates an embodiment of a honeycomb structure 20 made of a plurality of fibers boards 21 disposed parallel to each other at a distance in an insulating casing 22. Passages 23 are shown which have a rectangular section and extend between the fiber boards. FIG. 5 is an illustration of a further embodiment of a honeycomb structure 30 made of a plurality of flat fibers boards 31 and corrugated fibers boards 32 disposed alternatively and glued to each other in an insulating casing 33. Passages are formed between the flat and corrugated boards so that they extend along the boards. A pair of electrodes (not shown) may be connected to the fiber boards at the opposite ends thereof to provide a reactor of the invention.

The production of the fiber boards used in the invention will now be described. There may be used as fiber materials, for instance, inorganic fibers such as ceramic fibers, glass fibers, carbon fibers, alumina fibers or silica-alumina fibers, or organic fibers such as rayon fibers or cellulose fibers. These organic fibers are preferably used in conjunction with inorganic fibers in the invention because of their high dispersibility in water. However, such organic fibers as polyvinyl alcohol fibers, acrylic fibers, polyester fibers, polyacrylonitrile fibers or polyamide fibers may also be used. The fibers may be used singly or as a mixture of two or more.

In the production of the fiber boards, an organic binder is preferably used to improve dispersibility of the fibes in water as well as mechanical strength of the resultant wet fibers sheet by glueing the fibers together. Suitable organic binders include, for example, polyvinyl alcohol, acrylic resin, vinyl acetate resin, polyethylene, urea resin, melamine resin, carboxymethyl cellulose or starch, among which is in particular preferred polyvinyl alcohol. The organic binder is usually used in the form of aqueous solution or emulsion, but it may be used in the form of powder or fibers.

The fibers are formed into an aqueous slurry or a stock together with an electroconductive material and an organic binder. The stock usually has a solid concentration of about 0.1–3% by weight. The stock is then formed into a wet web of fibers, and the web is dehydrated and dried by means of a conventional paper making machine such as the Fourdrinier machine or the cylinder machine, to provide a web of fibers or fiber board. The thus produced fiber board has a thickness preferably of about 0.15–0.50 mm and a density of about 0.2–0.4 g/cm$^3$. The fibers board may then be corrugated, if necessary.

In general, the catalyst structure used to treat a fluid that contains a high concentration of ozone preferably contains heat resistant fibers, and such a structure is preferably mainly composed of inorganic fibers. By way of example, a stock may contain 80–96% by weight of inorganic fibers, 2–10% by weight of organic fibers and 2–10% by weight of organic binder based on the total of these materials. However, it is preferred that the amount of the organic materials is not more than 15% by weight. The greater the amount of the organic materials, the easier the production and processing of the fibers board, but the smaller the fiber board in mechanical strength.

It is preferred that the fiber board contains an electroconductive material in an amount of about 30–50% by weight. When the amount of the electroconductive material in the fibers board is less than about 30% by weight, the fibers board is remains substantially insulative so that it is not heated by being electrified, whereas it is difficult to produce a fiber board which contains an electroconductive material in an amount of more than 50% by weight by means of a conventional paper making process. It is further preferred that the fiber board has a micropore volume of not less than 0.2 cm$^3$/g so that a sufficient amount of the catalyst is supported thereon in a manner which will be hereinafter described.

However, when only fibers are formed into a fiber board by the conventional paper making process, and then an electroconductive material is supported thereon, more than 50% by weight of the electroconductive material may be supported on the fiber board. The catalyst structure is then formed by supporting the catalyst on the thus produced electroconductive fibers board by, for example, an immersing or a wash coat method.

According to the immersing method, the fiber board is immersed in a solution of a precursors of the catalyst to impregnate the fiber board with the solution, and is then dried and calcined to convert the precursors into the catalyst. The precursor may be a water soluble compound, for example, manganese acetate, which is converted into manganese oxides by being heated. The catalyst is supported in an amount of not less than 5% by weight so that the resultant catalyst structure has a sufficient activity of ozone decomposition. Usually, the amount of the catalyst is not more than 30% by weight since it is difficult to support the catalyst in a greater amount by the immersing method.

In a wash coat method, the fiber board is immersed in a slurry of the catalyst and is then dried to provide a catalyst structure. By way of example, when the fibers board has micropores of 300–400 Å in diameter and a micropore volume of 0.26–0.29 ml/g, it is preferred that the catalyst is supported in an amount of 0.05–0.5 g per unit volume of the fibers board. It is further preferred that the fiber board has a layer of the catalyst of a thickness of 10–200 μm. When the thickness is less than 10 μm, the catalyst structure has an insufficient acitivity of ozone decomposition per unit volume of the catalyst structure. However, even when the thickness is more than 200 μm, the ozone decomposition activity is not improved.

In addition to the above, there arises disadvantages as follows when the thickness is more than 200 μm. First, a large pressure loss takes place when an ozone containing fluid is passed through the passages of the honeycomb structure, so that a large power and a large power cost are necessary. Secondly, in particular in the case of the carrier in the form of a honeycomb mold, the catalyst covers the surfaces of the passages unevenly so that the passages are irregular in section and the fluid is prevented from effective diffusion into the catalyst layer. This leads to a reduced ozone decomposition activity per unit volume of the catalyst structure. Thirdly, the catalyst material is apt to be separated from the carrier and undesired environmental pollution is possibly brought about.

When the immersing or wash coat method is employed to support the catalyst on a carrier material, a fibers material may be supported together therewith. Any fibers may be used provided that they are resistant to ozone and are readily supported on the carrier. The fibers may be such that they have a large length/diameter ratio such as mullite ceramic fibers, C or E glass fibers or stainless fibers, or such that they have a small length/diameter ratio such as potassium titanate fibers or silicon carbide whiskers. However, from the standpoint of easiness of supporting, and useful synergetic effect of catalytic decomposition and mechanical decomposition of ozone with fibers, the fibers used have preferably of a length of 0.1–20 μm and a length/diameter ratio of 10–1000 when being supported on a carrier.

The fibers are supported on a carrier preferably in an amount of 2–20% by weight based on the materials supported on the carrier. When the amount of the fibers is more than 20% by weight, the fibers are unevenly supported or prevents effective decomposition of ozone with the catalyst.

In operating the reactor, the catalyst structure is electrified so that it is heated to an elevated temperature while a fluid which contains ozone therein is passed through the passages, and during the passage the fluid is put into contact with the catalyst so that ozone is catalytically decomposed.

The ozone decomposition may be carried out at a temperature of not less than about 20° C., preferably at a temperature of about 30°–90° C. When the reaction temperature is less than about 20° C., high valency oxides produced by the reaction of ozone and the catalyst are not decomposed and oxygen accumulates in the catalyst structure, to reduce ozone decomposition rate of the reactor with time.

The reaction temperature at which no reduction of the reaction rate takes place depends upon the catalyst used and the amount of ozone put into contact with per unit amount of the catalyst per unit time. In this regard, it is useful to determine the reaction temperature based on a CA value. The CA value is herein the specification is defined as the product of ozone concentration (ppm) at an inlet of a reactor and an area velocity of a waste gas introduced into the reactor, and the area velocity is defined as the value of space velocity (hr$^{-1}$) of the gas divided by gas contact are per unit volume (m$^2$/m$^3$) of catalyst structure. For example, when a waste gas is treated at a CA value of 100000 with a catalyst of MnO$_2$, the reaction is carried out at 60° C. When a binary catalyst of MnO$_2$ (80% by weight)/Ag$_2$O (20% by weight) is used, the reaction is carried out at 55° C., while a ternary catalyst of MnO$_2$ (70% by weight)/Ag$_2$O (10% by weight )/TiO$_2$ (20% by weight) is used, the reaction is carried out at 40° C. In turn, when a waste gas is treated at a CA value of 1000 with the catalysts as above, the reaction may be carried out at temperatures of 55° C., 50° C. and 35° C., respectively.

As set forth above, the reactor of the invention contains an electroconductive material so that it is electrified and ozone is put into contact with the catalyst at elevated temperatures. Therefore, ozone is decomposed at a high rate while the catalyst retains its high activity over a long period of time even under severe reaction conditions.

As a further aspect of the invention, there is provided a method of regenerating the ozone decomposing reactor as hereinbefore described, which comprises: electrifying and heating the catalyst structure to an elevated temperature, thereby to regenerate the catalyst.

The catalyst structure is preferably used at a temperature of not less than about 20° C., as hereinbefore set out. However, it is still often found that the ozone decomposition rate reduces with time when the ozone decomposition reaction is carried out at about 20° C. It may be necessitated by some reason that the reaction be carried out at lower temperatures, where the more severe the reaction conditions, the more rapidly the decomposition rate reduces.

However, in accordance with the invention, the catalyst structure is regenerated by electrifying and heating at temperatures preferably of not less than about 40° C., more preferably of not less than about 50° C., and most preferably of not less than about 70° C. More the temperature at which the catalyst structure is regenerated, the higher the ozone decomposition rate attained, so that the decomposition can be carried out over a longer period of time until the catalyst structure is deactivated to a predetermined level of activity.

The invention will now be described in more detail with reference to examples, however, the invention is not limited thereto.

EXAMPLE 1

An amount of 2 Kg of a ternary catalyst of MnO$_2$ (70% by weight)/Ag$_2$O (10% by weight)/TiO$_2$ (20% by weight) having a specific surface area of 32 m$^2$/g and an average particle size of 30 μm, 600 g of graphite powder, 60 g of methyl cellulose and water were admixed together.

The mixture was extruded into a honeycomb mold with a pitch of 1.3 mm and a wall thickness of 0.2 mm. The green mold was air-dried at 100° C. over 18 hours, and was then calcined at 450° C. over 3 hours. The honeycomb mold was cut into a catalyst structure of a size of 30 mm × 30 mm × 20 mm (axial length) and a pair of copper electrodes were fitted to the opposite walls. The catalyst structure was found to have a resistance of 314 Ω.

The catalyst structure was put into a casing to provide a reactor.

The activity of the reactor was measured as follows. The air was introduced into an ozone generator so that the air contained ozone in a predetermined concentration, and then the air was sent to the reactor while the reactor was electrified. The ozone concentrations in the air at the inlet and the outlet of the reactor were analyzed with an ozone analyzer. Ozone decomposition rate (%) was calculated based on an expression:

$[(C_1-C_2)/C_1] \times 100$, wherein $C_1$ is an ozone concentration at the inlet and $C_2$ is an ozone concentration at the outlet. The results are shown in the Table 1.

As apparent from the Table 1, the higher the temperature of the catalyst structure, the higher the ozone decomposition rate and the more durable the catalyst structure.

TABLE 1

| Temperature (°C.) | | Ozone Concentration | | Ozone Decomposition Rate (%) | | |
|---|---|---|---|---|---|---|
| Catalyst Structure | Gas at Outlet of Reactor | at Inlet of Reactor (ppm) | CA Value | Initial | After 100 hr. | After 1000 hr. |
| 20 | 20 | 1000 | 10000 | 78.9 | 28.7 | 6.0 |
| 30 | 20 | 1000 | 10000 | 84.4 | 67.4 | 40.9 |
| 40 | 21 | 1000 | 10000 | 93.1 | 85.9 | 41.6 |
| 50 | 25 | 1000 | 10000 | 94.9 | 94.9 | 95.1 |

EXAMPLE 2

An amount of 2 Kg of anatase titanium dioxide of a specific surface area of 58 m²/g and an average particle size of 17 μm, 600 g of graphite powder, 60 g of methyl cellulose and water were admixed together.

The mixture was extruded into a honeycomb mold with a pitch of 1.3 mm and a wall thickness of 0.2 mm. The green mold was air-dried at 100° C. over 18 hours, and was then calcined at 450° C. over 3 hours. The resultant electroconductive carrier honeycomb was found to have a micropore volume of 0.33 ml/g and an average micropore diameter of 185 Å.

An amount of 100 g of a ternary catalyst of $MnO_2$ (70% by weight)/$Ag_2O$ (10% by weight)/$TiO_2$(20% by weight) of a specific surface area of 32 m²/g and an average particle size of 30 μm, 80 ml of silica gel and 150 ml of alumina beads were mixed together, and the mixture was wet-milled over 30 minutes, to provide a slurry.

The carrier honeycomb was immersed in the slurry. After an excess of the slurry was removed by air blow, the honeycomb was dried at 50° C. over 18 hours, to provide a honeycomb catalyst structure. The catalyst structure was found to have a catalyst in an amount of 0.21 g per ml of the catalyst structure and a catalyst layer of a thickness of 63 μm as an average of 50 points measurement.

EXAMPLE 3

A honeycomb carrier was prepared in the same manner as in the Example 2, and was immersed in an aqueous solution of managanese acetate (300 g/l in terms of $MnO_2$). After an excess of the solution was removed by air blow, the honeycomb was air-dried at 80° C., dried at 100° C. over 18 hours, and was then calcined at 450° C. over 3 hours, to provide a honeycomb catalyst structure.

The catalyst structure was found to have a $MnO_2$ content of 9.1% by weight. It was further found that nearly all of the catalyst was present in a layer up to a depth of 60 μm from the surface.

EXAMPLE 4

An amount of 70 parts by weight of alumina-silica fibers having a diameter of 2.6–3.0 μm and a length of 5–30 mm, 5 parts by weight of 1.5 d rayon fibers having a length of 5 mm, 35 parts by weight of carbon fibers and 5 parts by weight of polyvinyl alcohol fibers as a binder were mixed together. The mixture was dispersed in water in an amount of 340 times the weight of the mixture to form a stock. The stock was made into a web sheet by means of a conventional cylinder paper making machine, and the web sheet was formed into a corrugated board of a corrugated height of 2.2 mm.

A mixture of 8.0 parts by weight of ethyl silicate of a solid content of 40% by weight, 13 parts by weight of ethyl alcohol, 6 parts by weight of water and 1 part by weight of 5% hydrochloric acid was sprayed in a rate of 100 g in terms of $SiO_2$ per 100 g of the board. The board was dried in a wet atmosphere for 3 hours, and then calcined at 450° C. in an oxidative atmosphere, to provide a carrier structure in the form of corrugated board. The board was found to have a micropore volume of 0.71 ml/g and an average micropore size of 2362 Å.

The corrugated board carrier was immersed in the same slurry as in the Example 2, an excess of the slurry was removed from the carrier by air blowing and air-dried. This operation was repeated once more, and then the board was dried at 100° C. over 18 hours, to provide a catalyst structure in the form of corrugated board. The catalyst structure was found to have a catalyst content of 0.34 g/ml.

The catalyst structures thus prepared in the Examples 2–4 were each cut to a volume of 30 mm×30 mm×20 mm (thickness) and a pair of electrodes of SUS 304 were attached to the opposite sides. The catalyst structures were found to have registances of 93 Ω, 91 Ω and 258 Ω, respectively. The catalyst structures were each placed in an insulative casing for use as a reactor.

The activity of the reactor was measured in the same manner as hereinbefore set forth. However, in this measurement, a CS value of $10^5$ ppm/hr was emplyed, instead of the CA value, which is defined as the ozone concentrationat the inlet of the reactor multiplied by the space velocityty, since gas acontact area per volume of the catalyst is undeterminable. The results are shown in the Table 2.

TABLE 2

| | Temperature (°C.) | | Ozone Concentration | | Ozone Decomposition Rate (%) | | |
|---|---|---|---|---|---|---|---|
| | Catalyst Structure | Gas at Outlet of Reactor | at Inlet of Reactor (ppm) | CS[1] | Initial | After 100 hr. | After 1000 hr. |
| Example 2 | 20 | 20 | 1000 | $10^8$ | 96.9 | 28.3 | 3.0 |
| | 30 | 21 | 1000 | $10^8$ | 99.9 | 64.8 | 35.3 |
| | 40 | 23 | 1000 | $10^8$ | 99.9 | 82.3 | 49.1 |
| | 50 | 25 | 1000 | $10^8$ | 99.9 | 99.9 | 99.9 |
| Example 3 | 30 | 22 | 1000 | $10^8$ | 89.7 | 15.8 | 1.2 |
| | 40 | 24 | 1000 | $10^8$ | 92.1 | 56.5 | 24.7 |
| | 50 | 27 | 1000 | $10^8$ | 93.4 | 75.6 | 43.2 |

TABLE 2-continued

| | Temperature (°C.) | | Ozone Concentration | | Ozone Decomposition Rate (%) | | |
| --- | --- | --- | --- | --- | --- | --- | --- |
| | Catalyst Structure | Gas at Outlet of Reactor | at Inlet of Reactor (ppm) | $CS^{1)}$ | Initial | After 100 hr. | After 1000 hr. |
| Example 4 | 60 | 36 | 1000 | $10^8$ | 95.0 | 95.2 | 94.8 |
| | 20 | 20 | 1000 | $10^8$ | 86.4 | 13.6 | 2.2 |
| | 30 | 21 | 1000 | $10^8$ | 90.8 | 59.2 | 26.5 |
| | 40 | 24 | 1000 | $10^8$ | 92.7 | 69.9 | 41.4 |
| | 50 | 26 | 1000 | $10^8$ | 94.1 | 94.0 | 94.0 |

Note:
[1)] Ozone concentration at inlet of reactor × space velocity (ppm/hr)

EXAMPLE 5

There was prepared an air which contained 1000 ppm of ozone and the air was passed through the same reactor as in the Example 1 at a CA value of 10000 at 20° C. The ozone decomposition rate was measured every ten hours. The results are shown under the column of the catalyst "as prepared". The longer the period over which the ozone decomposition was carried over with the catalyst, the more the catalyst was deactivated.

As a separate experiment, the same reactor as in the Example 1 was electrified and heated to 50° C. every ten hours to regenerate the catalyst. The results are shown in the Table 3. The catalyst was regenerated to have an activity of more than 99% every ten hours.

TABLE 3

| Reaction Time (hr) | Ozone Decomposition Rate (%) | | |
| --- | --- | --- | --- |
| | As Prepared | Before Heating | After Heating |
| 0 | 79.0 | | |
| 10 | 75.6 | 75.1 | 94.9 |
| 20 | 67.4 | 76.1 | 94.9 |
| 30 | 61.3 | 76.8 | 94.7 |
| 40 | 56.0 | 74.8 | 94.6 |
| 50 | 50.3 | 74.3 | 94.7 |
| 60 | 45.1 | 76.5 | 95.0 |
| 70 | 40.5 | 76.1 | 95.1 |
| 80 | 35.6 | 76.5 | 95.1 |
| 90 | 31.6 | 75.8 | 94.9 |
| 100 | 28.1 | 75.6 | 94.9 |

We claim:

1. An ozone decomposing reactor which comprises:
a catalyst structure composed of a carrier of a ceramic honeycomb mold having at least one passage extending therethrough for allowing an ozone containing waste gas to pass through the catalyst structure, and a catalyst having catalytic ozone decomposition activity in an amount effective to render the mold active for ozone decomposition and an electroconductive material in the form of powder, fibers or whiskers in an amount of 30-70% by weight based on the catalyst structure so that the catalyst structure generates heat when electric current is applied thereto; and
electrodes attached to the catalyst structure to electrify the structure, thereby to decompose ozone at elevated temperatures.

2. The ozone decomposing reactor as claimed in claim 1 wherein the carrier has the catalyst and the electroconductive material are dispersed evenly throughout the carrier.

3. The ozone decomposing reactor as claimed in claim 1 wherein the carrier has the catalyst and the electroconductive material supported thereon as a thin layer.

4. A method of decomposing ozone contained in a waste gas with a catalyst structure composed of a carrier of a ceramic honeycomb mold having at least one passage extending therethrough for allowing an ozone containing waste gas to pass through the catalyst structure, and a catalyst having catalytic ozone decomposition activity in an amount effective to render the mold active for ozone decomposition and an electroconductive material in the form of powder, fibers or whiskers in an amount of 30-70% by weight based on the catalyst structure so that the catalyst structure generates heat when the electric current is applied thereto, said catalyst and electroconductive material being carried in or on the carrier, which comprises: passing the waste gas through the passage while electrifying and heating the catalyst structure, thereby to decompose ozone at elevated temperatures.

5. The method as claimed in claim 4 wherein the carrier has the catalyst and the electroconductive material dispersed evenly throughout the carrier.

6. The method as claimed in claim 4 wherein the carrier has the catalyst and the electroconductive material supported thereon as a thin layer.

7. An ozone decomposing reactor which comprises:
a catalyst structure composed of a carrier of a fiber board having at least one passage extending therethrough for allowing an ozone containing waste gas to pass through the catalyst structure, and a catalyst having catalytic ozone decomposition activity to render the carrier active for ozone decomposition and an electroconductive material in the form of powder, fibers or whiskers in an amount of 30-50% by weight based on the fiber board so that the catalyst structure generates heat when electric current is applied thereto, said catalyst and electroconductive material being carried in or on the carrier; and
electrodes attached to the catalyst structure to electrify the structure, thereby to decompose ozone at elevated temperatures.

8. The ozone decomposing reactor as claimed in claim 7 wherein the carrier has the catalyst and the electroconductive material dispersed evenly throughout the carrier.

9. The ozone decomposing reactor as claimed in claim 7 wherein the carrier has the catalyst and the electroconductive material supported thereon as a thin layer.

10. The ozone decomposing reactor as claimed in claim 7 wherein the carrier is a corrugated fiber board.

11. The ozone decomposing reactor as claimed in claim 7 wherein a plurality of the catalyst structures are arranged in a casing so that passages are formed therebetween.

12. A method of decomposing ozone contained in a waste gas with a catalyst structure composed of a carrier of a fibers board having at least one passage extending therethrough for allowing an ozone containing waste gas to pass through the catalyst structure, and a catalyst having catalystic ozone decomposition activity in an amount effective to render the carrier active for ozone decomposition and an electroconductive material in the form of powder, fibers or whiskers in an amount of 30-50% by weight based on the fiber board so that the catalyst structure generates heat when electric current is applied thereto, said catalyst and electroconductive material being carried in or on the carrier, which comprises: passing the waste gas through the passage while electrifying and heating the catalyst structure, thereby to decompose ozone at elevated temperatures.

13. The method as claimed in claim 12 wherein the carrier has the catalyst and the electroconductive material dispersed evenly throughout the carrier.

14. The method as claimed in claim 12 wherein the carrier has the catalyst and the electroconductive material supported thereon as a thin layer.

* * * * *